United States Patent
Kikuta (10) Patent No.: US 12,027,836 B2
(45) Date of Patent: Jul. 2, 2024

(54) ROUTING MEMBER AND WIRE HARNESS

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Takamune Kikuta, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 194 days.

(21) Appl. No.: 17/786,734

(22) PCT Filed: Dec. 17, 2020

(86) PCT No.: PCT/JP2020/047170
§ 371 (c)(1),
(2) Date: Jun. 17, 2022

(87) PCT Pub. No.: WO2021/132020
PCT Pub. Date: Jul. 1, 2021

(65) Prior Publication Data
US 2023/0015264 A1     Jan. 19, 2023

(30) Foreign Application Priority Data

Dec. 24, 2019   (JP) .................. 2019-232708

(51) Int. Cl.
*H02G 3/04*      (2006.01)
*B60R 16/02*     (2006.01)

(52) U.S. Cl.
CPC ....... *H02G 3/0406* (2013.01); *B60R 16/0215* (2013.01)

(58) Field of Classification Search
CPC .................. H02G 3/0406; B60R 16/0215
(Continued)

(56) References Cited

U.S. PATENT DOCUMENTS

| | | | |
|---|---|---|---|
| 2007/0102188 A1* | 5/2007 | Glew | H01B 11/22 174/113 C |
| 2013/0161092 A1 | 6/2013 | Kurita et al. | |
| 2016/0071630 A1 | 3/2016 | Sugino | |

FOREIGN PATENT DOCUMENTS

| | | |
|---|---|---|
| JP | S63-055478 U1 | 4/1988 |
| JP | 2003-273542 A | 9/2003 |

(Continued)

OTHER PUBLICATIONS

International Search Report dated Feb. 16, 2021 for WO 2021/132020 A1 (5 pages).

*Primary Examiner* — Timothy J Thompson
*Assistant Examiner* — Michael F McAllister
(74) *Attorney, Agent, or Firm* — Venjuris, P.C.

(57) ABSTRACT

The present disclosure provides a routing member and a wire harness that are capable of absorbing tolerances. A wire harness 10 has a routing member 40. The routing member 40 has a body portion 41 having a columnar shape, and a groove portion 42 in which a wire 20 is to be accommodated, the groove portion 42 being formed on an outer circumferential side of the body portion 41. The groove portion 42 has a meandering portion 45 extending in an axial direction of the body portion 41 while meandering. The wire harness 10 has the wire 20 accommodated in the groove portion 42 of the routing member 40 and routed along the groove portion 42.

10 Claims, 9 Drawing Sheets

(58) Field of Classification Search
USPC .................................................. 174/72 A
See application file for complete search history.

(56) References Cited

FOREIGN PATENT DOCUMENTS

| | | |
|---|---|---|
| JP | 2012-197049 A | 10/2012 |
| JP | 2012-248459 A | 12/2012 |
| JP | 2015-220760 A | 12/2015 |

* cited by examiner

ROUTING MEMBER AND WIRE HARNESS

CROSS REFERENCE TO RELATED APPLICATIONS

This application is a national phase of PCT application No. PCT/JP2020/047170, filed on 17 Dec. 2020, which claims priority from Japanese patent application No. 2019-232708, filed on 24 Dec. 2019, all of which are incorporated herein by reference.

TECHNICAL FIELD

The present disclosure relates to a routing member and a wire harness.

BACKGROUND

A wire harness used in vehicles such as hybrid vehicles and electric vehicles conventionally includes wires that electrically connect electrical devices, such as a high-voltage battery and an inverter (e.g., see Patent Document 1). In this type of wire harness, dimensional tolerances between the wires and the electrical devices are absorbed with the wires by making the wires flexible.

PRIOR ART DOCUMENT

Patent Document

Patent Document 1: JP 2016-058137 A

SUMMARY OF THE INVENTION

Problems to be Solved

Wire harnesses mounted in hybrid vehicles, electric vehicles, and the like need to allow large currents to flow, and the diameter of the wires increases. However, the larger, i.e., the thicker the wires are, the more rigid the wires become, making it more difficult for the wires to bend. This results in a difficulty in absorbing tolerances such as dimensional tolerances between the wires and the electrical devices.

The present disclosure aims to provide a routing member and a wire harness that are capable of absorbing tolerances.

Means to Solve the Problem

A routing member of the present disclosure includes: a body portion having a columnar shape; and a groove portion in which a wire is to be accommodated, the groove portion being formed on an outer circumferential side of the body portion, wherein the groove portion has a meandering portion extending in an axial direction of the body portion while meandering.

A wire harness of the present disclosure has the above routing member and the wire accommodated in the groove portion and routed along the groove portion.

Effect of the Invention

The routing member and the wire harness of the present disclosure exhibit the effect of absorbing tolerances.

DETAILED DESCRIPTION TO EXECUTE THE INVENTION

Description of Embodiment of Present Disclosure

First, embodiments of the present disclosure will be listed and described.

[1] A routing member of the present disclosure includes: a body portion having a columnar shape; and a groove portion in which a wire is to be accommodated, the groove portion being formed on an outer circumferential side of the body portion, wherein the groove portion has a meandering portion extending in an axial direction of the body portion while meandering.

According to this configuration, the meandering portion extending in the axial direction of the body portion while meandering is formed in the groove portion formed on the outer circumferential side of the body portion. By forming this meandering portion, the entire length of the groove portion is made longer than the shortest distance between end portions in the axial direction of the body portion. When a wire is routed along the meandering portion, the wire can be routed in a meandering manner in accordance with the shape of the meandering portion. As a result, the wire routed along the groove portion can be routed with an excess length in the axial direction of the body portion. For this reason, if the meandering portion elongates or contracts in the axial direction of the body portion, the wire can also elongate or contract in the axial direction of the body portion, following the elongation or contraction of the meandering portion. Tolerances, such as dimensional tolerances, between the wire and an electrical device can be absorbed by thus elongating or contracting the wire in the axial direction of the body portion.

[2] It is preferable that the meandering portion meanders in a circumferential direction of the body portion.

According to this configuration, the meandering portion meanders in the circumferential direction of the body portion. This configuration makes it possible to suppress an increase in the size in the radial direction of the body portion, compared with the meandering portion meandering in the radial direction of the body portion, for example.

[3] It is preferable that the meandering portion has a shape including a U-shape in a plan view in a radial direction of the body portion.

According to this configuration, a wire can be routed with an excess length in the axial direction of the body portion by routing this wire along the U-shape of the meandering portion.

[4] It is preferable that the meandering portion has a shape including an S-shape in a plan view in a radial direction of the body portion.

According to this configuration, a wire can be routed with an excess length in the axial direction of the body portion by routing this wire along the S-shape of the meandering portion.

[5] It is preferable that a plurality of the groove portions are formed on the outer circumferential side of the body portion, and each of the plurality of groove portions has the meandering portion.

According to this configuration, wires to can be separately routed in the respective grooves. This configuration enables the plurality of wires to be routed in a separated state in the respective groove portions.

[6] It is preferable that the plurality of groove portions are formed radially with a center axis of the body portion as a center.

According to this configuration, the plurality of groove portions are radially formed with the center axis of the body portion as a center. For this reason, when a plurality of wires are routed along the plurality of groove portions, these wires can be radially arranged with the center axis of the body portion as a center.

[7] It is preferable that an end portion in the axial direction of the body portion has a spindle shape. According to this configuration, the end portion in the axial direction of the body portion is formed into a spindle shape. This configuration makes it possible to make a step height between the outer circumferential surface of the body portion and the outer circumferential surface of the wire at the end portion in the axial direction of the body portion smaller than that in the other portions. It is, therefore, possible to preferably provide, for example, a fixing member for fixing the routing member to the outer circumferential surface of the wire to the end portion in the axial direction of the body portion.

[8] It is preferable that the body portion has an open-hole portion penetrating the body portion in the axial direction, and the groove portion is formed on an outer circumferential side of the open-hole portion.

According to this configuration, the open-hole portion is formed in the body portion, separately from the groove portion. Thus, wires can be separately routed in the groove portion and the open-hole portion. This configuration enables a plurality of wires to be routed in a separated state in the groove portion and the open-hole portion.

[9] A wire harness of the present disclosure has the routing member according to any of the above items [1] to [8], and the wire accommodated in the groove portion and routed along the groove portion.

According to this configuration, the meandering portion extending in the axial direction of the body portion while meandering is formed in the groove portion formed on the outer circumferential side of the body portion of the routing member. By forming this meandering portion, the entire length of the groove portion is made longer than the shortest distance between end portions in the axial direction of the body portion. When a wire is routed along the meandering portion, the wire can be routed in a meandering manner in accordance with the shape of the meandering portion. As a result, the wire routed along the groove portion can be routed with an excess length in the axial direction of the body portion. For this reason, if the meandering portion elongates or contracts in the axial direction of the body portion, the wire can also elongate or contract in the axial direction of the body portion, following the elongation or contraction of the meandering portion. Tolerances, such as dimensional tolerances, between the wire and an electrical device can be absorbed by thus elongating or contracting the wire in the axial direction of the body portion.

[10] It is preferable to further include a fixing member fixing the routing member to an outer circumferential surface of the wire.

According to this configuration, the routing member is fixed to the outer circumferential surface of the wire by the fixing member. This configuration makes it possible to preferably suppress a position shift of the routing member with respect to the wire.

DETAILS OF EMBODIMENTS OF PRESENT DISCLOSURE

Specific examples of the routing member and the wire harnesses of the present disclosure will be described below with reference to the drawings. In the drawings, some configurations may be exaggerated or simplified for convenience of the description. The dimensional ratios between parts may differ between the drawings. The terms "parallel" or "orthogonal" in the present specification may encompass not only the cases of being strictly parallel or orthogonal, but also the cases of being substantially parallel or orthogonal within the scope in which the operation and effects of the present embodiment are exhibited. Note that the present invention is not limited to these examples but defined by the claims, and is intended to encompass all changes made within the meaning and scope equivalent to the claims.

(Overall Configuration of Wire Harness 10)

Figure 1:
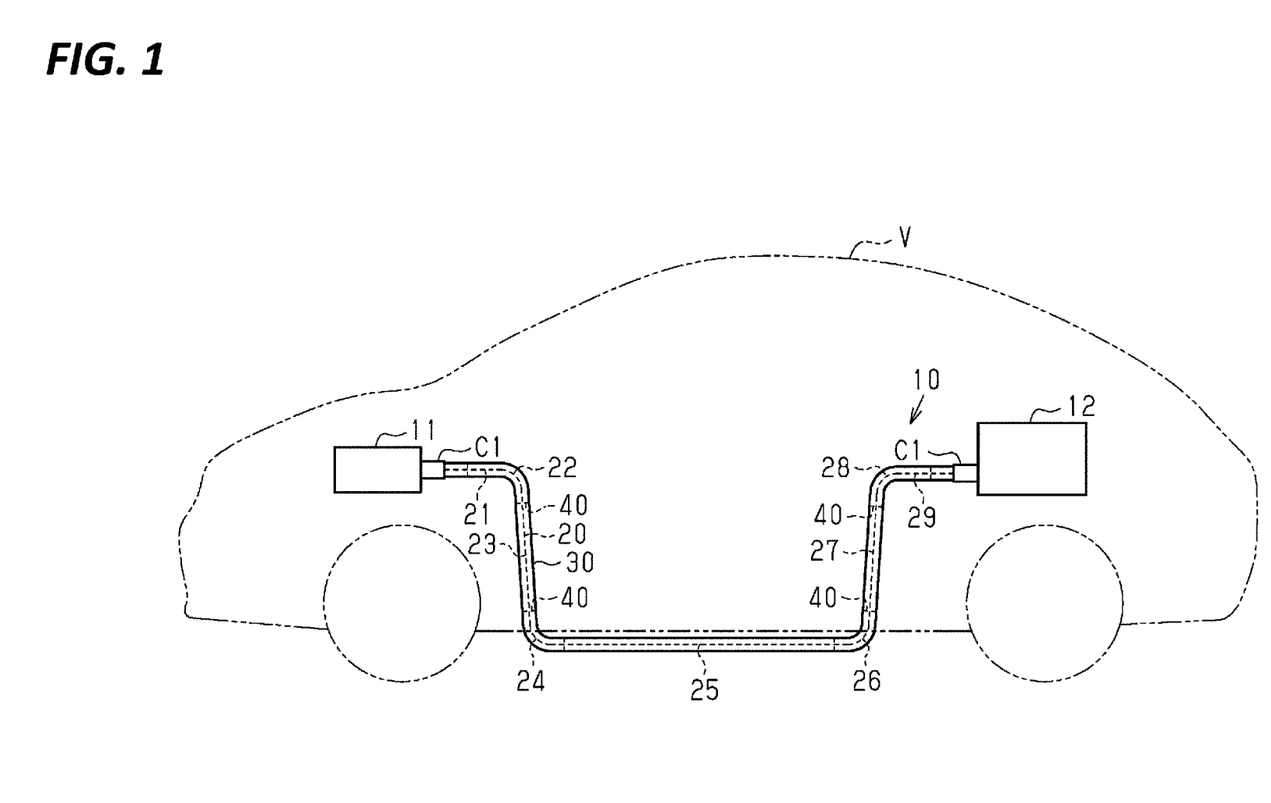
FIG. 1 is a schematic configuration diagram showing a wire harness of an embodiment.

A wire harness 10 shown in FIG. 1 electrically connects two, or three or more electrical devices (devices). For example, the wire harness 10 electrically connects an inverter 11 installed in a front part of a vehicle V, such as a hybrid vehicle or an electric vehicle, to a high-voltage battery 12 installed on the rear side of the vehicle V with respect to the inverter 11. The wiring harness 10 is routed to pass, for example, under the floor of the vehicle V. The inverter 11 is connected to a wheel drive motor (not shown) that serves as a motive power source for vehicle travel. The inverter 11 generates AC power from DC power of the high-voltage battery 12 and supplies the generated AC power to the motor. The high-voltage battery 12 is a battery capable of supplying a high voltage in the range from a hundred and several tens of volts to several hundreds of volts, for example.

The wire harness 10 has one or more wires 20, two connectors C1 attached to respective end portions of the wires 20, a covering member 30 that surrounds the outer periphery of the wires 20, and one or more routing members 40. In the wire harness 10 of the present embodiment, six wires 20 are accommodated in the covering member 30. In the wire harness 10 of the present embodiment, four routing members 40 are spaced apart in the lengthwise direction of the wires 20.

(Configuration of Wires 20)

Each wire 20 has an elongated shape. Each wire 20 has one end portion that is connected to the inverter 11 via a connector C1, and another end portion that is connected to the high-voltage battery 12 via a connector C1. The wires 20 are bent two-dimensionally or three-dimensionally depending on the routing path of the wire harness 10, for example. The wires 20 of the present embodiment have a straight portion 21 extending in the vehicle longitudinal direction from the connector C1 connected to the inverter 11, a bent portion 22 provided at an end of the straight portion 21, a straight portion 23 extending toward the vehicle lower side from the bent portion 22, and a bent portion 24 provided at an end of the straight portion 23. The wires 20 of the present embodiment have a straight portion 25 extending in the vehicle longitudinal direction from the bent portion 24, a bent portion 26 provided at an end of the straight portion 25, a straight portion 27 extending toward the vehicle upper side from the bent portion 26, a bent portion 28 provided at an end of the straight portion 27, and a straight portion 29 extending in the vehicle longitudinal direction from the bent portion 28.

The wires 20 are high-voltage wires capable of dealing with high voltages and large currents, for example. The wires 20 may be shielded wires having an electromagnetic shield structure, or may be non-shielded wires that do not have an electromagnetic shield, for example. The wires 20 are coated wires each of which has a core wire made of a conductor and an insulating coating that covers the core wire, for example. The core wire may be, for example, a twisted wire constituted by a plurality of metal strands twisted together, a columnar conductor constituted by a single columnar metal rod having a solid internal structure, or a tubular conductor having a hollow internal structure. The core wire may be a combination of a twisted wire, a columnar conductor, and/or a tubular conductor. Examples of columnar conductors may include a single-core wire and a bus bar. The core wire of each wire 20 of the present embodiment is a twisted wire.

Figure 2:
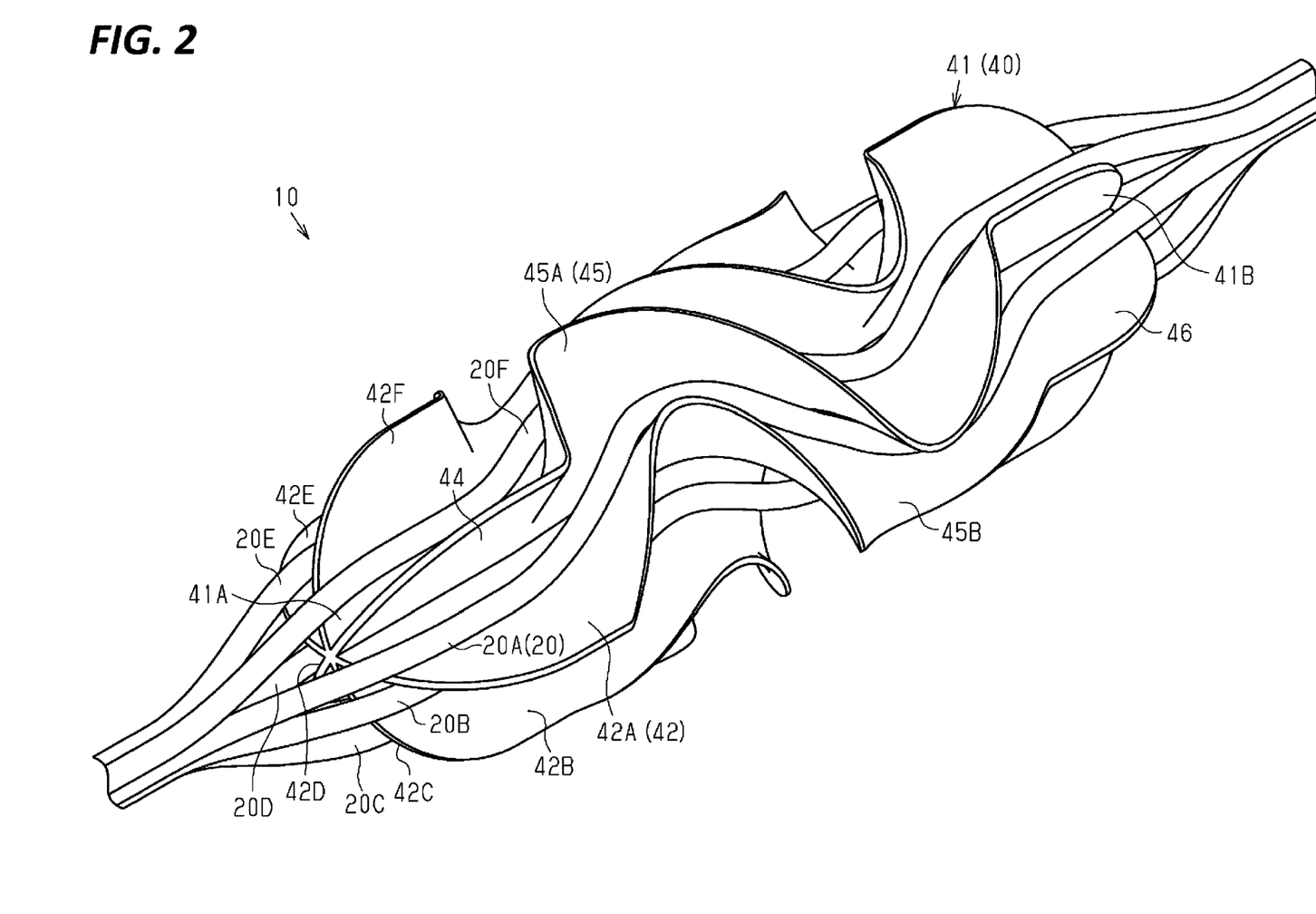
FIG. 2 is a schematic perspective view of the wire harness of the embodiment.

As shown in FIG. 2, the wires 20 of the present embodiment include six wires 20A, 20B, 20C, 20D, 20E, and 20F. In the following description, the wires 20A, 20B, 20C, 20D, 20E, and 20F will also be collectively referred to as "wires 20".

(Configuration of Covering Member 30)

As shown in FIG. 1, the covering member 30 has an elongated tubular shape as a whole. One or more (six in the present embodiment) wires 20 are accommodated in an internal space of the covering member 30. The covering member 30 is formed to surround the entire outer periphery of the plurality of wires 20 in the circumferential direction, for example. The covering member 30 protects the wires 20 accommodated therein from flying objects and water droplets. The covering member 30 may be, for example, a metal or resin pipe, a resin protector, a flexible corrugated tube made of a resin or the like, a rubber water-proofing cover, or a combination thereof.

(Configuration of Routing Members 40)

The routing members 40 are accommodated in the internal space of the covering member 30, for example. Each routing member 40 extends along the routing path of the wire harness 10, for example. Each routing member 40 is provided at a portion extending in the lengthwise direction of the wires 20, for example. The plurality of routing members 40 are spaced apart from each other in the lengthwise direction of the wires 20, for example. The routing members 40 are provided close to the ends of the wires 20 that are connected to electrical devices such as the inverter 11 and the high-voltage battery 12, for example. The routing members 40 are provided in correspondence with the bent portions 22, 24, 26, and 28 of the wires 20, for example.

As shown in FIG. 2, each routing member 40 has, for example, a columnar body portion 41, and one or more (six in the present embodiment) groove portions 42 formed on an outer circumferential side of the body portion 41. The body portion 41 has a cylindrical or prism shape as a whole, for example. The body portion 41 of the present embodiment has a cylindrical shape as a whole.

(Configuration of Groove Portions 42)

Each groove portion 42 is recessed inward in the radial direction of the body portion 41 from the outer circumferential surface of the body portion 41. In each routing member 40 of the present embodiment, six groove portions 42A, 42B, 42C, 42D, 42E, and 42F are spaced apart from each other in the circumferential direction of the body portion 41. The plurality of groove portions 42A to 42F are radially formed with the center axis of the body portion 41 as a center, for example. The plurality of groove portions 42A to 42F radially extend in the radial direction with the center axis of the body portion 41 as a center. The plurality of groove portions 42A and 42F are arranged at equal intervals in the circumferential direction of the body portion 41, for example. The plurality of groove portions 42A to 42F are formed over the entire outer circumferential surface in the circumferential direction of the body portion 41, for example. In the following description, the groove portions 42A, 42B, 42C, 42D, 42E, and 42F will also be collectively referred to as "groove portions 42". Note that FIG. 2 omits the covering member 30 shown in FIG. 1.

Figure 3:
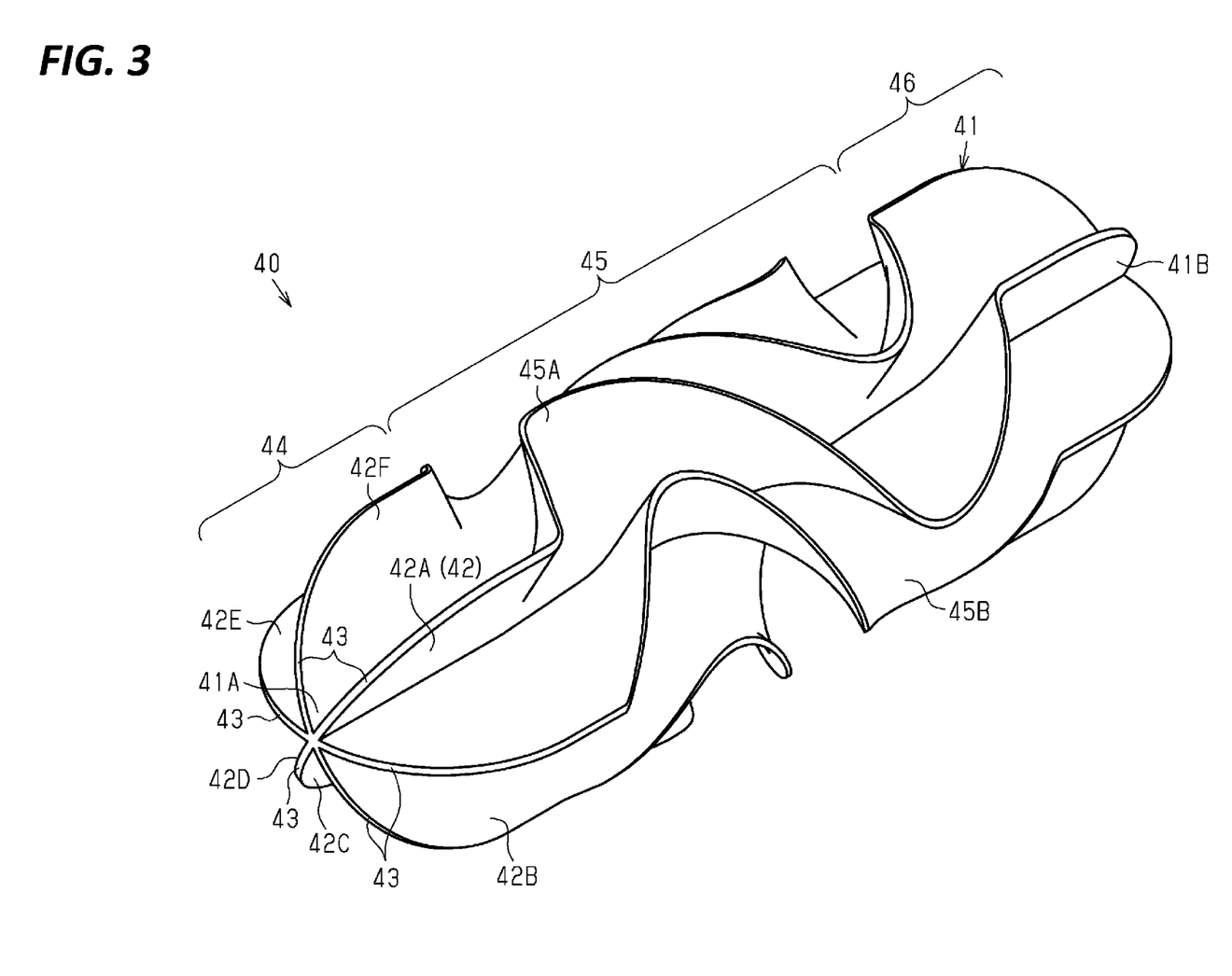
FIG. 3 is a schematic perspective view of a routing member of the embodiment.

As shown in FIG. 3, the body portion 41 has a plurality of (six in the present embodiment) wall portions 43 that protrude outward in the radial direction from the center in the radial direction of the body portion 41, for example. The plurality of wall portions 43 are spaced apart from each other in the circumferential direction of the body portion 41, for example. Each wall portion 43 radially extends in the radial direction with the center axis of the body portion 41 as a center, for example. The plurality of wall portions 43 are arranged at equal intervals in the circumferential direction of the body portion 41, for example. The six wall portions 43 of the present embodiment are provided at positions spaced apart from each other by $\pi/3$ [rad] in the circumferential direction of the body portion 41. Each wall portion 43 extends in the radial direction of the body portion 41, for example.

Each groove portion 42 of the present embodiment is constituted by two wall portions 43 that are adjacent to each other in the circumferential direction of the body portion 41. That is, each groove portion 42 is constituted by a space surrounded by two wall portions 43 that are adjacent to each other in the circumferential direction of the body portion 41. Each groove portion 42 extends over the entire length of the body portion 41 in the axial direction in which the center axis thereof extends, for example. The lateral cross-sectional shape of each groove portion 42, i.e., the cross-sectional shape taken by cutting the groove portion 42 by a plane orthogonal to the axial direction (lengthwise direction) of the body portion 41 may be any shape. The lateral cross-sectional shape of each groove portion 42 may be a polygonal shape, a semi-circular shape, or a flat shape, for example. The lateral cross-sectional shape of each groove portion 42 of the present embodiment is a triangular shape. The lateral cross-sectional shape of each groove portion 42 of the present embodiment is a triangular shape that is open toward the outer circumferential side of the body portion 41. The lateral cross-sectional shape of each groove portion 42 of the present embodiment is a triangular shape with which the width of the groove extending in the circumferential direction of the body portion 41 increases as it extends outward in the radial direction from the center in the radial direction of the body portion 41.

Each groove portion 42 has a straight portion 44, a meandering portion 45, and a straight portion 46, for example. The straight portions 44 and 46 linearly extend in the lengthwise direction (axial direction) of the body portion 41, for example. The straight portions 44 and 46 sandwich the meandering portion 45 in the axial direction of the body portion 41, for example. The straight portions 44 and 46 are provided at the same position in the circumferential direction of the body portion 41, for example. That is, the straight portions 44 and 46 are provided on a single straight line extending in a direction parallel to the axial direction of the body portion 41. The meandering portion 45 extends in the axial direction of the body portion 41 while meandering, for example. In each groove portion 42, the straight portion 44, the meandering portion 45, and the straight portion 46 are formed continuously. In the following description, the direction in which the straight portion 44, the meandering portion 45, and the straight portion 46 are arranged will be referred to as a lengthwise direction of the groove portion 42 (the straight portions 44 and 46 and the meandering portion 45).

(Configuration of Meandering Portion 45)

The meandering portion 45 meanders in the circumferential direction of the body portion 41, for example. The meandering portion 45 meanders alternately in one direction and the other direction of the circumferential direction of the body portion 41, for example. The meandering portion 45 of the present embodiment does not meander in the radial direction of the body portion 41. That is, the depth of the meandering portion 45 of the present embodiment is fixed over the entire length in the lengthwise direction of the meandering portion 45.

Figure 4:
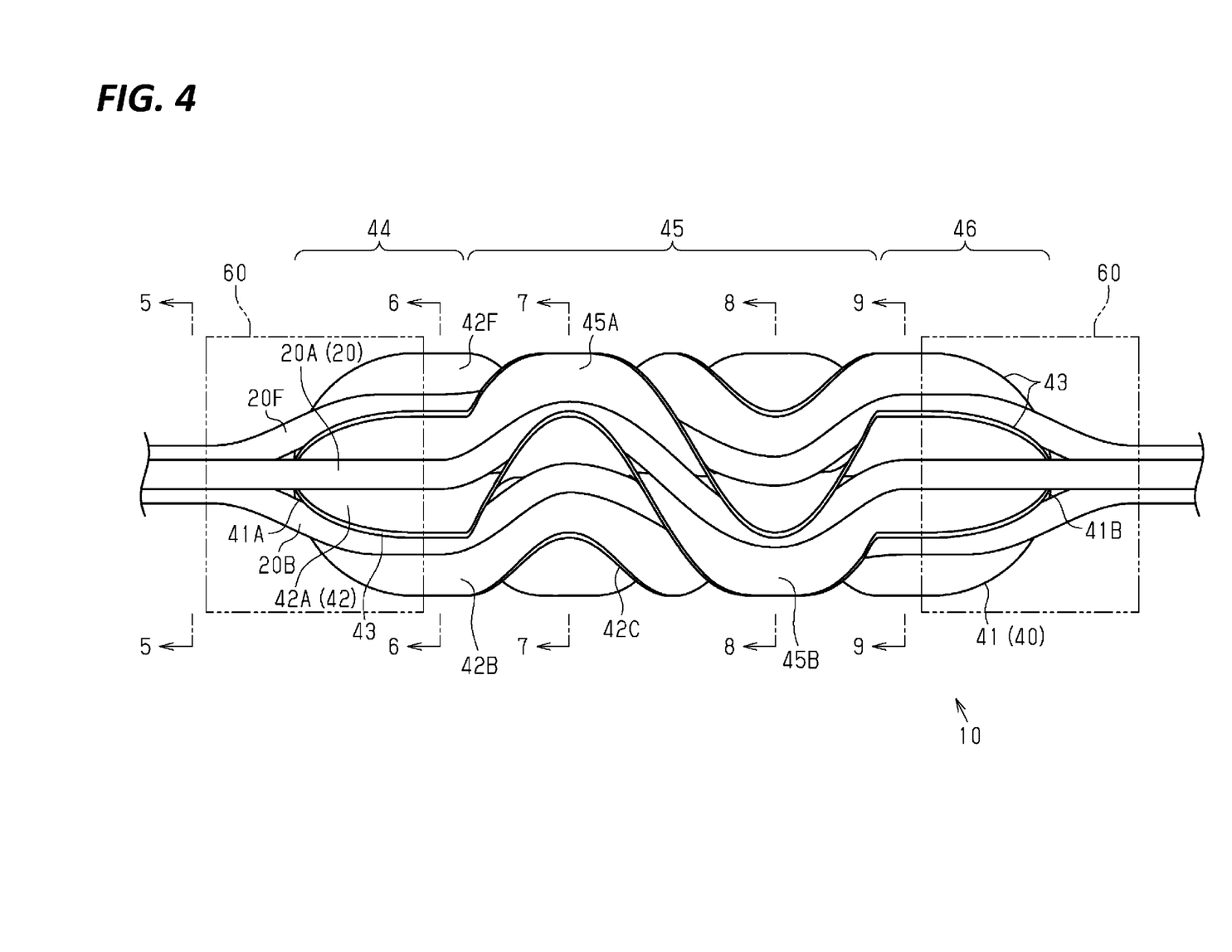
FIG. 4 is a schematic plan view of the wire harness of the embodiment.

As shown in FIG. 4, the meandering portion 45 has one or more (here, two) bent portions 45A and 45B. The shape of the meandering portion 45 in a plan view in the radial direction of the body portion 41 is a shape including a U-shape, for example. For example, the shape of the meandering portion 45 in a plan view in the radial direction of the body portion 41 is a shape in which U-shapes are continuous in the axial direction of the body portion 41. The shape of the meandering portion 45 of the present embodiment in a plan view in the radial direction of the body portion 41 is an S-shape. Note that FIG. 4 omits the covering member 30 shown in FIG. 1.

(Configuration of Bent Portion 45A)

The bent portion 45A is continuous with the straight portion 44, for example. The bent portion 45A expands in one direction (upward in the diagram) of the circumferential direction of the body portion 41 from the straight portion 44, for example. The shape of the bent portion 45A in a plan view in the radial direction of the body portion 41 is a U-shape, for example. The shape of the bent portion 45A in a plan view in the radial direction of the body portion 41 is a shape that curves at a portion protruding in one direction of the circumferential direction of the body portion 41 with respect to the straight portion 44, for example. The groove width of the bent portion 45A is made the same as the groove width of the straight portion 44, for example.

(Configuration of Bent Portion 45B)

For example, one end of the bent portion 45B is continuous with the bent portion 45A, and the other end of the bent portion 45B is continuous with the straight portion 46. The bent portion 45B expands in the opposite direction (downward in the diagram) of the circumferential direction of the body portion 41 from the straight portion 46, for example. The shape of the bent portion 45B in a plan view in the radial direction of the body portion 41 is a shape including a U-shape, for example. The shape of the bent portion 45B in a plan view in the radial direction of the body portion 41 is a shape that curves at a portion protruding in the opposite direction of the circumferential direction of the body portion 41 with respect to the straight portion 46, for example. The groove width of the bent portion 45B is made the same as the groove width of the straight portion 46 and the groove width of the bent portion 45A, for example. In each groove portion 42, the straight portion 44, the meandering portion 45 (bent portions 45A and 45B), and the straight portion 46 have the same groove width, for example.

In each routing member 40, the entire length in the lengthwise direction of each groove portion 42 is longer than the shortest distance between end portions 41A and 41B in the axial direction of the body portion 41, due to the provision of the meandering portion 45.

As shown in FIG. 3, the end portions 41A and 41B in the axial direction of the body portion 41 each have a spindle shape, for example. The end portions 41A and 41B of the body portion 41 become thinner as they extend away from the meandering portion 45, for example. The end portions 41A and 41B of the body portion 41 may also have a tapered shape, for example. The end portions 41A and 41B of the body portion 41 of the present embodiment may also have a conical shape. Here, the end portions 41A and 41B of the body portion 41 are provided to sections of the body portion 41 in which the straight portions 44 and 46 are formed. The wall portions 43 that constitute the straight portions 44 and 46 are formed so that their height in the radial direction of the body portion 41 becomes shorter as the wall portions 43 extend away from the meandering portion 45, at the respective end portions 41A and 41B of the body portion 41.

In each routing member 40, the section of the body portion 41 in which the straight portion 44 is formed, the section of the body portion 41 in which the meandering portion 45 is formed, and the section of the body portion 41 in which the straight portion 46 is formed are continuously integrated into a single component, for example. In each routing member 40, the section of the body portion 41 in which the straight portion 44 is formed, the section of the body portion 41 in which the meandering portion 45 is formed, and the section of the body portion 41 in which the straight portion 46 is formed are made of the same material, for example. The material of the routing members 40 may be a stretchable material, for example. The material of the routing members 40 may be an elastic material such as a rubber or an elastomer, for example.

(Routing of Wires 20)

As shown in FIG. 2, one or more (one in the present embodiment) wires 20, for example, are accommodated in each of the groove portions 42A to 42F. In the present embodiment, six wires 20A to 20F are separately accommodated in the six groove portions 42A to 42F. That is, in the present embodiment, each of the wires 20A to 20F is accommodated in a corresponding one of the groove portions 42A to 42F. Specifically, the wire 20A is accommodated in the groove portion 42A, the wire 20B is accommodated in the groove portion 42B, and the wire 20C is accommodated in the groove portion 42C. The wire 20D is accommodated in the groove portion 42D, the wire 20E is accommodated in the groove portion 42E, and the wire 20F is accommodated in the groove portion 42F.

Figure 5:
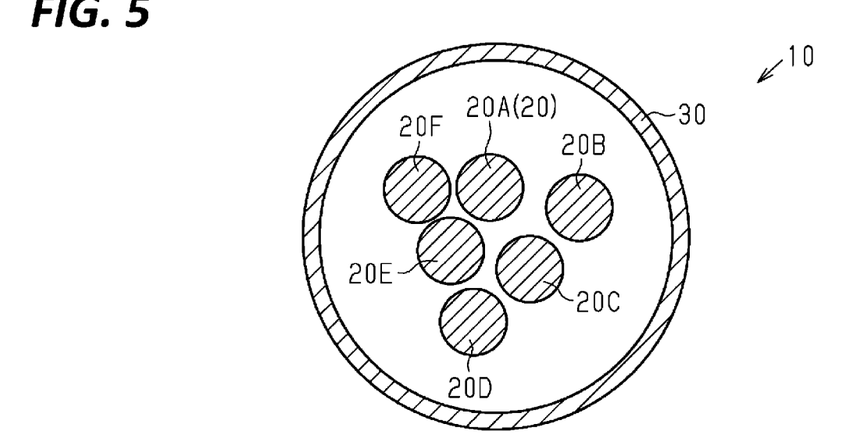
FIG. 5 is a schematic lateral cross-sectional view (cross-sectional view taken along line 5-5 in FIG. 4) of the wire harness of the embodiment.

As shown in FIG. 4, the six wires 20A to 20F are collectively routed in the sections where they are not accommodated in the groove portions 42A to 42F of each routing member 40. For example, the wires 20A to 20F in the sections where they are not accommodated in the groove portions 42A to 42F of each routing member 40 are routed while being bundled by a tape member or the like. Here, the six wires 20A to 20F are accommodated within the covering member 30, as shown in FIG. 5.

As shown in FIG. 4, the wires 20A to 20F are separated into individual wires, separately accommodated in the respective groove portions 42A to 42F of each routing member 40, and routed along the groove portions 42A to 42F, for example. Here, the wires 20A to 20F are routed along the straight portions 44, the meandering portions 45, and the straight portions 46 of the groove portions 42A to 42F.

Figure 6:
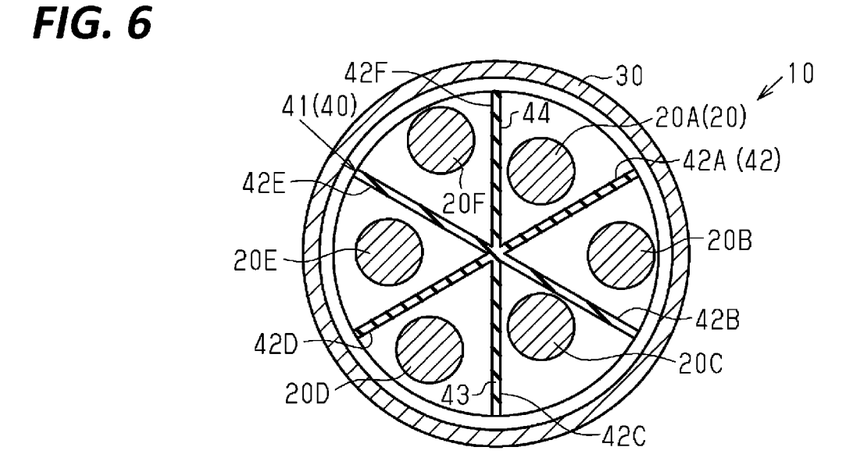
FIG. 6 is a schematic lateral cross-sectional view (cross-sectional view taken along line 6-6 in FIG. 4) of the wire harness of the embodiment.

As shown in FIGS. 4 and 6, first, the wires 20A to 20F are routed along the straight portions 44 of the groove portions 42A to 42F. The wires 20A to 20F are routed, linearly extending in the axial direction of the body portion 41 within the straight portions 44 of the groove portions 42A to 42F. Here, the six wires 20A to 20F and the routing member 40 are accommodated within the covering member 30, as shown in FIG. 6.

Figure 7:
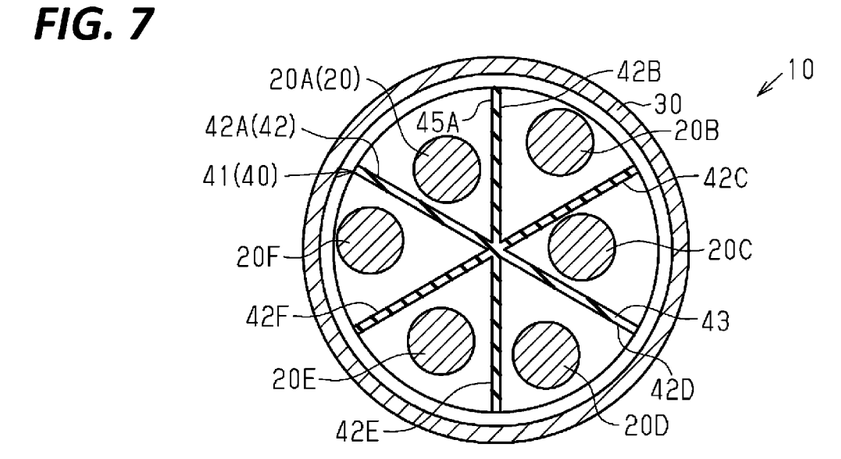
FIG. 7 is a schematic lateral cross-sectional view (cross-sectional view taken along line 7-7 in FIG. 4) of the wire harness of the embodiment.

As shown in FIG. 4, the wires 20A to 20F are routed along the bent portions 45A of the meandering portions 45, following the straight portions 44. Thus, the wires 20A to 20F are routed, meandering along the bent portions 45A in the circumferential direction of the body portion 41. Here, as shown in FIG. 7, the wires 20A to 20F routed in the bent portions 45A are routed in positions rotated approximately $\pi/3$ [rad] in the circumferential direction of the body portion 41 from the positions of the wires 20A to 20F routed in the straight portions 44 (see FIG. 6). For example, the wires 20A to 20F routed in the bent portions 45A are routed in positions rotated approximately $\pi/3$ [rad] leftward (counterclockwise) in the circumferential direction of the body portion 41 from the positions of the wires 20A to 20F routed in the straight portions 44 (see FIG. 6).

Figure 8:
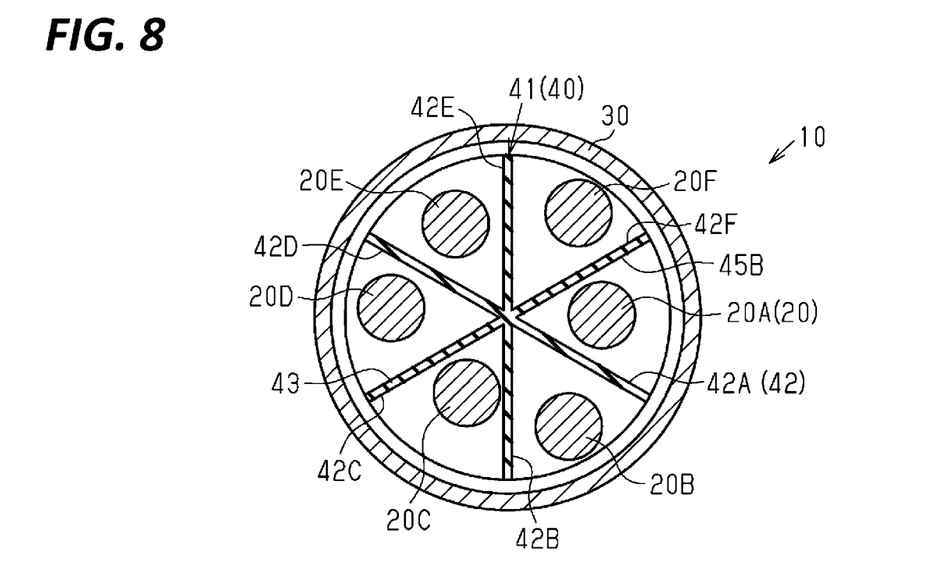
FIG. 8 is a schematic lateral cross-sectional view (cross-sectional view taken along line 8-8 in FIG. 4) of the wire harness of the embodiment.

As shown in FIG. 4, the wires 20A to 20F are routed along the bent portion 45B, following the bent portions 45A. Thus, the wires 20A to 20F are routed, meandering along the bent portions 45B in the circumferential direction of the body portion 41. Here, as shown in FIG. 8, the wires 20A to 20F routed in the bent portions 45B are routed in positions rotated approximately $2\pi/3$ [rad] in the circumferential direction of the body portion 41 from the positions of the wires 20A to 20F routed in the bent portions 45A (see FIG. 7). For example, the wires 20A to 20F routed in the bent portions 45B are routed in positions rotated approximately $2\pi/3$ [rad] rightward (clockwise) in the circumferential direction of the body portion 41 from the positions of the wires 20A to 20F routed in the bent portions 45A (see FIG. 7). For example, the wires 20A to 20F routed in the bent portions 45B are routed in positions rotated approximately $\pi/3$ [rad] rightward (clockwise) in the circumferential direction of the body portion 41 from the positions of the wires 20A to 20F routed in the straight portions 44 (see FIG. 6).

Figure 9:
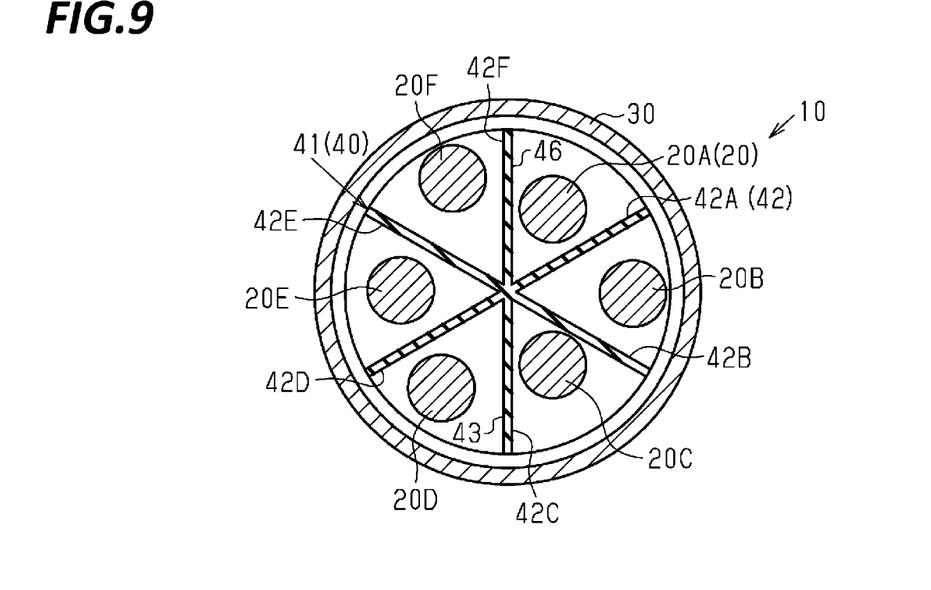
FIG. 9 is a schematic lateral cross-sectional view (cross-sectional view taken along line 9-9 in FIG. 4) of the wire harness of the embodiment.

As shown in FIG. 4, the wires 20A to 20F are routed along the straight portions 46, following the bent portions 45B. The wires 20A to 20F are routed, linearly extending in the axial direction of the body portion 41 within the straight portions 46 of the groove portions 42A to 42F. Here, as shown in FIG. 9, the wires 20A to 20F routed in the straight portions 46 are routed in positions rotated approximately $\pi/3$ [rad] in the circumferential direction of the body portion 41 from the positions of the wires 20A to 20F routed in the bent portions 45B (see FIG. 8). For example, the wires 20A to 20F routed in the straight portions 46 are routed in positions rotated approximately $\pi/3$ [rad] leftward in the circumferential direction of the body portion 41 from the positions of the wires 20A to 20F routed in the bent portions 45B (see FIG. 8).

As shown in FIG. 4, the wires 20A to 20F are routed, meandering in the circumferential direction of the body portion 41, by being routed along the meandering portions 45 of the groove portions 42A to 42F. The wires 20A to 20F of the present embodiment are routed, meandering twice in the circumferential direction of the body portion 41, by being routed along the two bent portions 45A and 45B of the meandering portions 45. As a result, the wires 20A to 20F routed along the groove portions 42 are routed with an excess length in the axial direction of the body portions 41.

(Configuration of Fixing Members 60)

The routing members 40 are fixed to the wires 20 by fixing members 60, for example. The fixing members 60 are, for example, formed to fix the end portions 41A and 41B in the lengthwise direction of the body portion 41 to the outer circumferential surfaces of the wires 20 that are led out from the routing member 40. The fixing members 60 may be tape members, cable ties, clamp bands, or the like, for example. The fixing members 60 of the present embodiment are tape members each having an adhesive layer on one surface.

The fixing members 60 are wound around the outer circumferential surfaces of the end portions 41A and 41B of the body portion 41, and the outer circumferential surfaces of the wires 20 that are led out from the routing member 40, for example. The fixing members 60 are continuously wound in respective ranges from the outer circumferential surfaces of the end portions 41A and 41B of the body portion 41 to the outer circumferential surfaces of the wires 20, for example. Here, the routing member 40 and the wire 20 can be easily fixed by the fixing members 60 since the end portions 41A and 41B of the body portion 41 each have a tapered spindle shape. Each fixing member 60 has an overlapping winding structure, for example. Here, "overlap winding structure" refers to a structure in which the fixing member 60 is helically wound so that predetermined sections in the width direction of the fixing member 60 overlap each other. The overlapping winding structure is preferably a half-wrap winding structure, for example. Here, "half-wrap winding structure" refers to a structure in which the fixing member 60 is helically wound so that sections of about one half in the width direction of the fixing member 60 overlap each other.

The fixing members 60 are only provided to the outer circumferential surface of the sections of the body portion 41 in which the straight portions 44 and 46 are formed, for example. In other words, the fixing members 60 are not provided to the outer circumferential surface of the section of the body portion 41 in which the meandering portion 45 is formed, for example.

As shown in FIGS. 6 to 9, the covering member 30 surrounds the outer periphery of the routing members 40, for example. The covering member 30 surrounds the entire outer circumference of the routing member 40 in the circumferential direction, for example. The covering member 30 collectively surrounds the plurality of wires 20, for example. The covering member 30 surrounds the entire outer circumference of the plurality of wires 20 in the circumferential direction thereof, for example.

(Operative Effect of Routing Members 40)

Next, the operative effect of the routing member 40 will be described.

The groove portions 42 formed on the outer circumferential side of the body portion 41 of each routing member 40 each have a meandering portion 45 that extends in the axial direction of the body portion 41 while meandering. By forming this meandering portion 45, the entire length of each groove portion 42 is longer than the shortest distance between the end portions 41A and 41B in the axial direction of the body portion 41. When a wire 20 is routed along this meandering portion 45, the wire 20 can be routed in a meandering manner in accordance with the shape of the meandering portion 45. As a result, the wire 20 routed along each groove portion 42 can be routed with an excess length in the axial direction of the body portion 41. For this reason, if the meandering portion 45 elongates or contracts in the axial direction of the body portion 41, the wire 20 can also elongate or contract in the axial direction of the body portion 41, following the elongation or contraction of the meandering portion 45. Tolerances, such as dimensional tolerances, between the wire 20 and an electrical device can be absorbed by thus elongating or contracting the wire 20 in the axial direction of the body portion 41.

For example, each wire 20 is routed within the corresponding meandering portion 45 with an excess length in the axial direction of the body portion 41, as shown in FIG. 4. A description will be given of the case where the meandering portion 45 of a groove portion 42 elongates from the state shown in FIG. 4.

Figure 10:
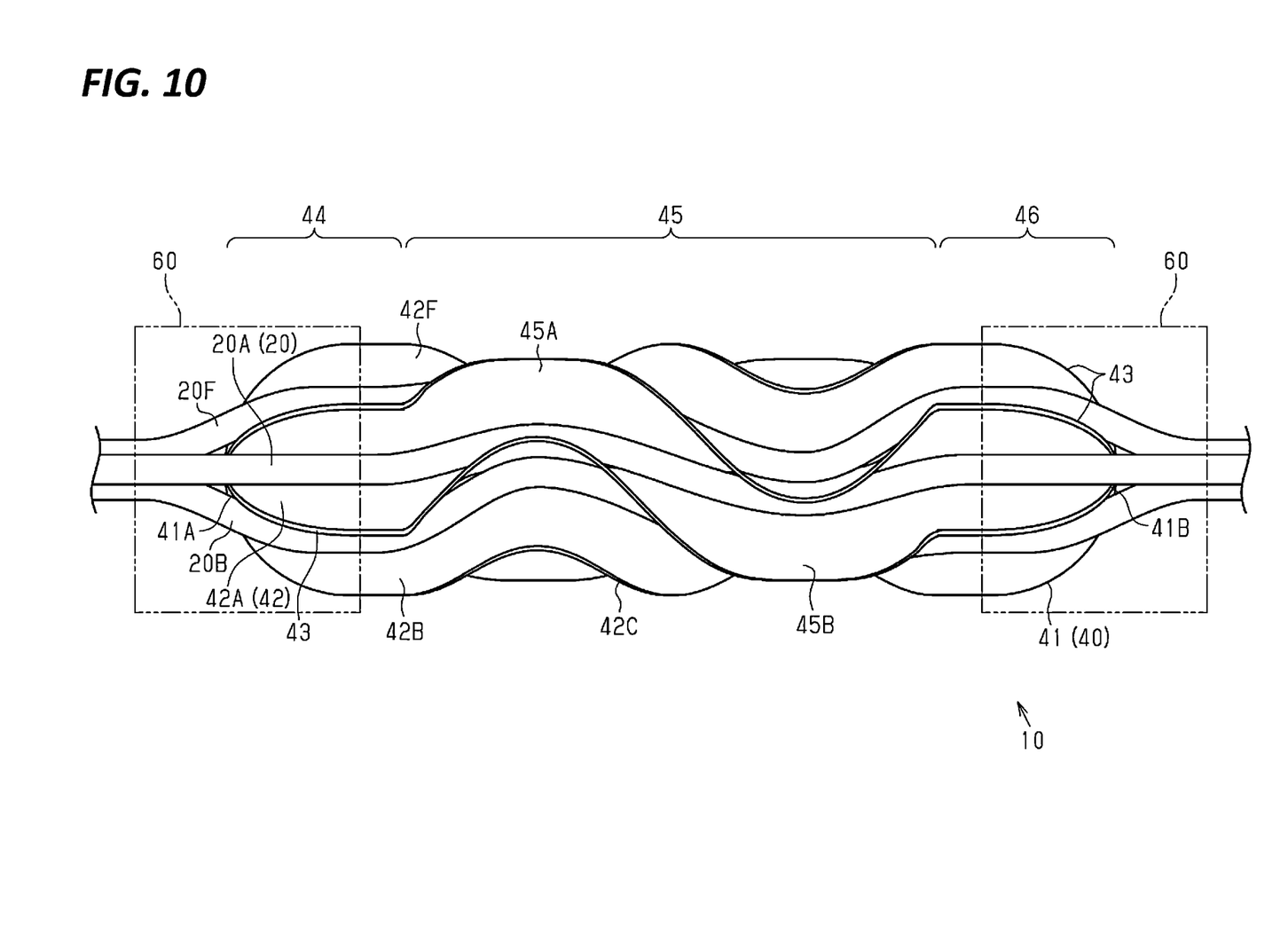
FIG. 10 is a schematic plan view illustrating an operation of the wire harness of the embodiment.

If the routing member 40 elongates in the axial direction of the body portion 41, the section of the body portion 41 that includes the meandering portion 45 elongates in the axial direction of the body portion 41, as shown in FIG. 10. That is, the meandering portion 45 elongates and approaches a state of linearly extending in the axial direction of the body portion 41. Then, an excess-length section of the wire 20 that has been routed with an excess length within the meandering portion 45 elongates in the axial direction of the body portion 41, following the elongation of the meandering portion 45. The length in the axial direction of the wire 20 can thus be extended, and for example, dimensional tolerances between the wire 20 and an electrical device can be absorbed.

Next, a description will be given of the case where a routing member 40 is installed at the bent portion 22 of the wires 20 (see FIG. 1).

Figure 11:
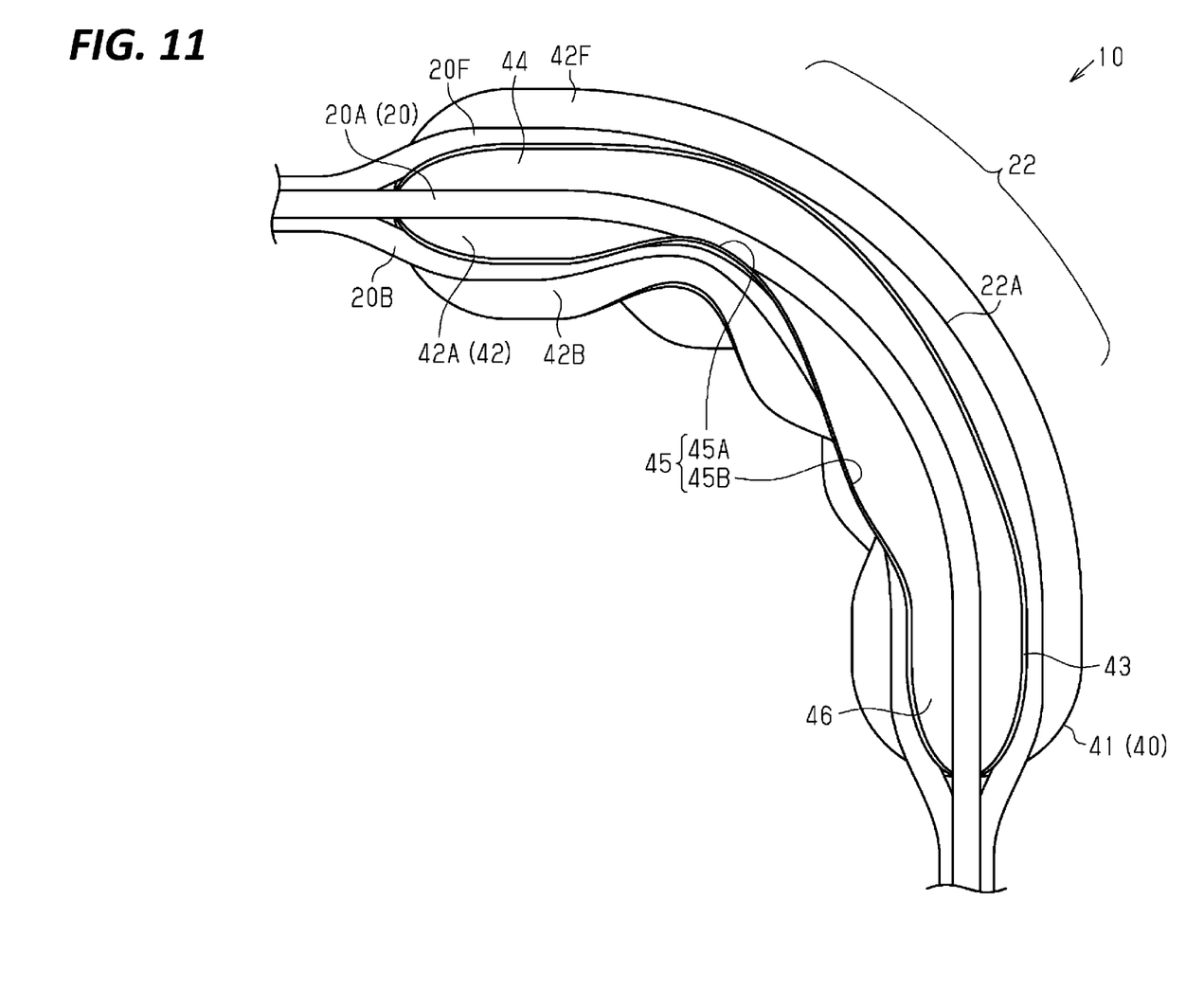
FIG. 11 is a schematic side view illustrating an operation of the wire harness of the embodiment.

As shown in FIG. 11, if the routing member 40 is bent at its intermediate portion in the axial direction, e.g., if the routing member 40 is bent to change its axial direction from the vehicle longitudinal direction to the vehicle vertical direction, the section of the body portion 41 that includes the meandering portion 45 is elongated in the axial direction of the body portion 41. Specifically, the meandering portion 45 is bent so that the section including the meandering portion 45 elongates in the axial direction of the body portion 41 while this axial direction changes. Then, the excess-length section of the wire 20 that has been routed with an excess length within the meandering portion 45 elongates in the axial direction of the body portion 41, following the elongation and bending of the meandering portion 45. The bent portion 22 can thus be formed by bending the wire 20 while elongating the excess-length section of the wire 20, and it is, therefore, possible to preferably prevent the length of the wire 20 from being insufficient in the bent portion 22. This configuration makes it possible to preferably suppress problems such as the wire 20 being broken in the bent portion 22. Particularly, although the bending amount of a bent outer side 22A of the bent portion 22 is large, the wire 20 can be preferably adapted to this bending amount with the excess-length section of the wire 20. It is, therefore, possible to prevent the wire 20 being damaged in the bent portion 22. By thus installing a routing member 40 in the bent portion 22, it is possible to preferably suppress problems such as the wire 20 being damaged because of an insufficient length of the wire 20 in the bent portion 22. Furthermore, even if the curvature radius of the bent portion 22 is extremely small, or the curvature radius of the bent portion 22 is extremely large, the wire 20 being damaged in the bent portion 22 can be preferably suppressed by adjusting the shape of the meandering portion 45 and adjusting the excess length of the wire 20.

Next, effects of the present embodiment will be described.

(1) Each groove portion 42 formed on the outer circumferential side of the body portion 41 of each routing member 40 has a meandering portion 41 that extends in the axial direction of the body portion 45 while meandering. By routing a wire 20 along the meandering portion 45, this wire 20 can be routed with an excess length in the axial direction of the body portion 41. For this reason, if the meandering portion 45 elongates or contracts in the axial direction of the body portion 41, the wire 20 can also elongate or contract in the axial direction of the body portion 41, following the elongation or contraction of the meandering portion 45. Tolerances, such as dimensional tolerances between the wire 20 and an electrical device, can be absorbed by thus elongating or contracting the wire 20 in the axial direction of the body portion 41.

(2) The meandering portion 45 meanders in the circumferential direction of the body portion 41. This configuration makes it possible to suppress an increase in the size in the radial direction of the body portion 41, compared with the case where the meandering portion 45 meanders in the radial direction of the body portion 41, for example.

(3) The meandering portion 45 has a shape including an S-shape in a plan view in the radial direction of the body portion 41. According to this configuration, a wire 20 can be routed with an excess length in the axial direction of the body portion 41 by routing this wire 20 along the S-shape of the meandering portion 45.

(4) The plurality of groove portions 42A to 42F are radially formed with the center axis of the body portion 41 as a center, in the outer circumferential surface of the body portion 41. Further, the wires 20A to 20F are accommodated in the respective groove portions 42A to 42F. According to this configuration, the wires 20A to 20F can be separately routed in the respective grooves 42A to 42F. This configuration enables the plurality of wires 20A to 20F to be routed in a separated state in the respective groove portions 42A to 42F.

(5) The end portions 41A and 41B extending in the axial direction of the body portion 41 each have a spindle shape. This configuration makes it possible to make a step height between the outer circumferential surface of the body portion 41 and the outer circumferential surfaces of the wires 20 at the end portions 41A and 41B of the body portion 41 smaller than that in the other portions. For this reason, the fixing members 60 for fixing the routing member 40 to the outer circumferential surfaces of the wires 20 can be easily fixed to the end portions 41A and 41B of the body portion 41 and the wires 20, for example. The fixing members 60 can thus preferably fix the routing member 40 to the wires 20. As a result, a position shift of the routing member 40 with respect to the wires 20 can be preferably suppressed.

Other Embodiments

The above embodiment can be modified and implemented as follows. The above embodiment and the following modifications can be implemented in combination as long as no technical contradiction arises.

The shape of the meandering portion 45 of the routing member 40 in the above embodiment is not specifically limited. For example, the number of times the meandering portion 45 meanders is not limited to two, and may be changed to one, or three or more. For example, the bent portion 45A of the meandering portion 45 may also be omitted.

The shape of the meandering portion 45 in a plan view in the radial direction of the body portion 41 of the routing member 40 may also be a shape including a V-shape, for example. For example, the shape of the meandering portion 45 in a plan view in the radial direction of the body portion 41 may be a shape in which V-shapes are continuous in the axial direction of the body portion 41.

In the routing member 40 of the above embodiment, the meandering portion 45 meanders in the circumferential direction of the body portion 41. This need not be the case, and the meandering portion 45 may alternatively meander in the radial direction of the body portion 41, i.e., the depth direction of the groove portions 42, for example. In this case, the depth of the groove portions 42 is changed along the lengthwise direction of the groove portions 42.

In the above embodiment, the plurality of groove portions 42A to 42F are arranged at equal intervals in the circumferential direction of the body 41, but may alternatively be arranged at unequal intervals in the circumferential direction of the body portion 41.

In the above embodiment, the plurality of groove portions 42A to 42F are formed over the entire outer circumferential surface of the body portion 41 in the circumferential direction. However, this need not be the case. For example, the plurality of groove portions 42 may also be formed only in a part, in the circumferential direction, of the outer circumferential surface of the body portion 41. For example, the plurality of groove portions 42 may be formed in only half, in the circumferential direction, of the outer circumferential surface of the body portion 41.

The number of groove portions 42 of the routing member 40 of the above embodiment is not specifically limited. The number of groove portions 42 in the routing member 40 may also be any of one to five, and may also be seven or more.

In the above embodiment, the routing member has a cylindrical shape as a whole. However, the shape of the routing member 40 is not specifically limited.

Figure 12:
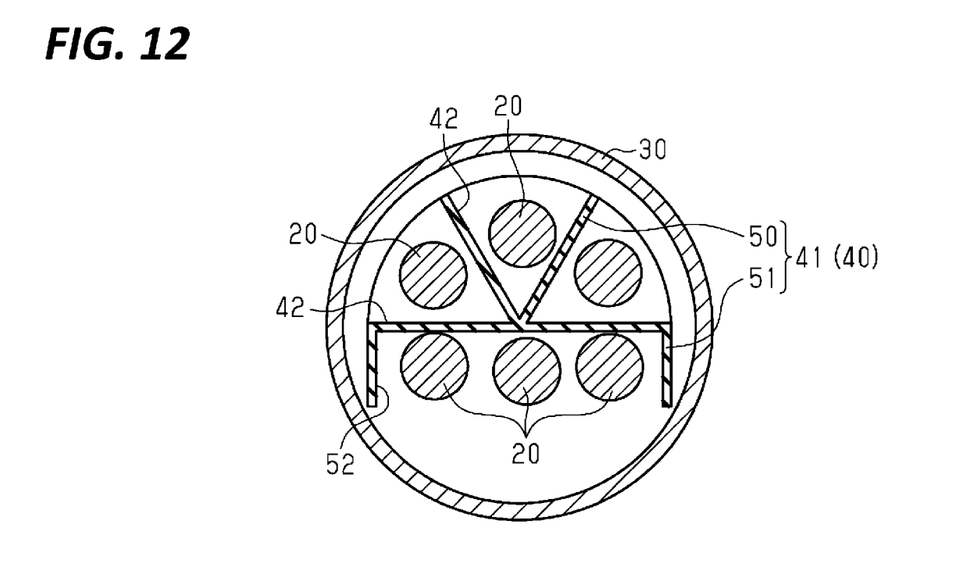
FIG. 12 is a schematic lateral cross-sectional view of a wire harness in a variation.

For example, the body portion 41 may also be formed into a shape that is a combination of a semi-cylinder and a quadrangular column, as shown in FIG. 12. The body portion 41 in this case has a body portion 50 having a semi-cylindrical shape, and a body portion 51 having a quadrangular columnar shape, for example.

One or more (here, three) groove portions 42 are formed in the outer circumferential surface of the body portion 50. The groove portions 42 each have the meandering portion 45 shown in FIG. 2. A wire 20 is accommodated in each groove portion 42. One or more (here, one) groove portion 52 is formed in the outer circumferential surface of the body portion 51. The groove portion 52 may optionally have the same meandering portion as the meandering portion 45 shown in FIG. 2, for example. That is, the groove portion 52, of the plurality of groove portions 42 and 52, need not have a meandering portion. One or more (here, three) wires 20 are accommodated in the groove portion 52.

If, for example, the groove portion 52 does not have a meandering portion, and the routing member 40 is arranged at a bent portion of the wire 20, it is favorable that the body portion 50 side of the body portion 41 on which the groove portions 42 having the meandering portions 45 are formed are arranged on the bent outer side.

In the variation shown in FIG. 12, the groove portion 52 may be omitted.

Figure 13:
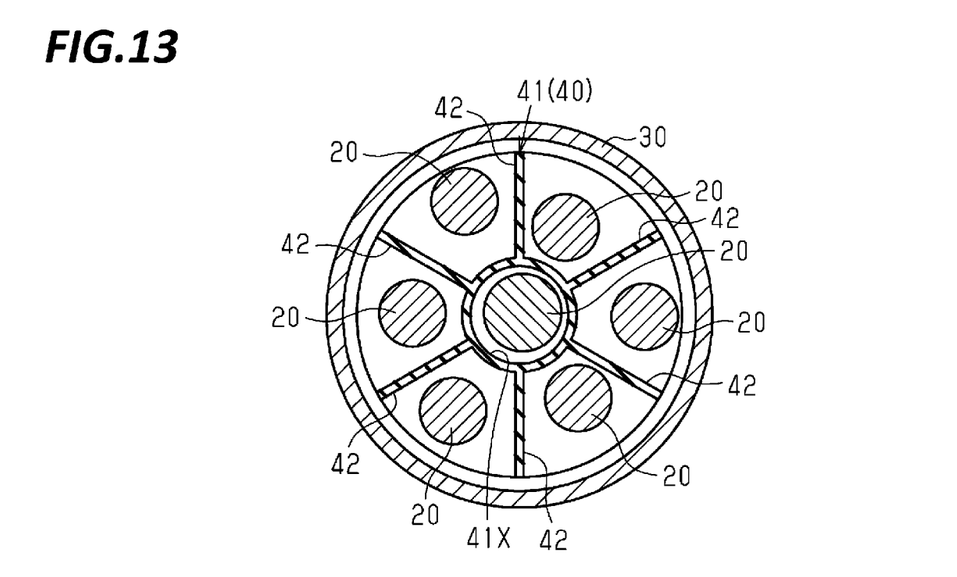
FIG. 13 is a schematic lateral cross-sectional view of a wire harness in a variation.

For example, the body portion 41 may have an open-hole portion 41X that penetrates the body portion 41 in the axial direction thereof, as shown in FIG. 13. The open-hole portion 41X in the example shown in FIG. 13 is formed at the center of a lateral cross-section of the body portion 41. An outer circumferential surface of the open-hole portion 41X is continuously formed over the entire circumference in the circumferential direction of the body portion 41, for example. That is, the open-hole portion 41X is continuously surrounded by the outer circumferential surface over the entire circumference in the circumferential direction of the body portion 41. The open-hole portion 41X does not have the meandering portion 45 shown in FIG. 2, for example.

One or more (here, six) groove portions 42 are formed in the outer circumferential surface of the open-hole portion 41X. The groove portions 42 each have the meandering portion 45 shown in FIG. 2. In the example shown in FIG. 13, the six groove portions 42 are spaced apart from each other in the circumferential direction of the body portion 41. The plurality of groove portions 42 are radially formed with the open-hole portion 41X as a center, for example. Each groove portion 42 is separated from the open-hole portion 41X, for example. In other words, the columnar body portion 41 may have an inner circumferential surface that demarcates the open-hole portion 41X penetrating the body portion 41 in the axial direction, and an outer circumferential surface that opposes the inner circumferential surface in a direction orthogonal to the axial direction of the body portion 41. In this case, one or more (here, six) groove portions 42 are formed in the outer circumferential surface of the body portion 41.

One or more (here, one) wires 20 are accommodated in each groove portion 42. The wire 20 accommodated in each groove portion 42 are separated from the open-hole portion 41X. One or more (here, one) wires 20 are accommodated in the open-hole portion 41X. For example, the thickest one of the plurality of wires 20 is accommodated in the open-hole portion 41X, for example. The wire 20 accommodated in the open-hole portion 41X is separated from the groove portions 42.

According to this configuration, the groove portions 42 and the open-hole portion 41X are formed in the body portion 41. Thus, the wires 20 can be separately routed in the groove portions 42 and the open-hole portion 41X. This configuration enables the plurality of wires 20 to be routed in a separated state in the groove portions 42 and the open-hole portion 41X. Further, the open-hole portion 41X is separated from the groove portions 42. This configuration makes it possible to preferably suppress external factors affecting the wires 20 by routing a wire 20, which particularly should not be subjected to external factors, in the open-hole portion 41X, for example.

In the above embodiment, the entire routing member 40 is made of the same material. However, this need not be the case. For example, the sections of the body portion 41 in which the straight portions 44 and 46 are formed may also be made of a material different from that of the section of the body portion 41 in which the meandering portion 45 is formed. In this case as well, the section of the body portion 41 in which the meandering portion 45 is made of a stretchable material.

In the above embodiment, a stretchable material is used as the material of the routing member 40. However, this need not be the case. For example, the material of the routing member 40 may be a material that breaks after being elongated. In this case as well, tolerances can be absorbed due to the excess-length section of the wire 20 elongating following the elongation of the routing member 40.

The shape of each routing member 40 in the above embodiment is not specifically limited. For example, the shape of the routing member 40 is not specifically limited as long as it has the groove portions 42 each having the meandering portion 45. For example, the straight portions 44 and 46 of the routing member 40 may be omitted. For example, the structure of the routing member 40 may be changed to have a plurality of meandering portions 45.

In the above embodiment, the routing members 40 are provided at some portions in the longitudinal direction of the wires 20. However, this need not be the case, and the routing members 40 may also be provided over the entire length in the lengthwise direction of the wires 20.

The number of routing members 40 in the wire harness 10 of the above embodiment is not specifically limited. The number of routing members 40 may also be any or one to three, and may also be five or more.

The covering member 30 in the above embodiment may also be omitted.

An electromagnetic shielding member may also be provided within the covering member 30 in the above embodiment. The electromagnetic shielding member is, for example, provided between the inner circumferential surface of the covering member 30 and the outer circumferential surfaces of the wires 20. The electromagnetic shielding member may be, for example, a flexible braided wire or metal foil.

In the above embodiment, the number of wires 20 included in the wire harness 10 is not specifically limited, and can be changed as per the specifications of the vehicle V. For example, a low-voltage wire for connecting a low-voltage battery to various low-voltage devices (e.g., a lamp, a car audio etc.) may also be added to the wires included in the wire harness 10.

The arrangement relationship between the inverter 11 and the high-voltage battery 12 in the vehicle V is not limited to that of the above embodiment, and may be changed as appropriate, as per the vehicle configuration.

The above embodiment employs the inverter 11 and the high-voltage battery 12 as electrical devices to be connected by the wire harness 10. However, this need not be the case. For example, the above embodiment may alternatively be employed for a wire harness for connecting the inverter 11 to a wheel drive motor. That is, the present invention is applicable to any kind of wire harness that electrically connects electrical devices mounted in the vehicle V.

In the above embodiment, the wires 20 are embodied as high-voltage wires. However, the wires 20 may alternatively be embodied as low-voltage wires.

The embodiments disclosed herein are in all respects illustrative and should not be considered restrictive. The scope of the present invention is indicated not by the above-described meanings but by the claims, and is intended to encompass all changes made within the meanings and scope equivalent to the claims.

LIST OF REFERENCE NUMERALS

V Vehicle
C1 Connector
10 Wire harness
11 Inverter
12 High-voltage battery
20, 20A to 20F Wire
21, 23, 25, 27, 29 Straight portion
22, 24, 26, 28 Bent portion
22A Bent outer side
30 Covering member
40 Routing member
41 Body portion
41A, 41B End portion
41X Open-hole portion
42, 42A to 42F Groove portion
43 Wall portion
44 Straight portion
45 Meandering portion
45A, 45B Bent portion
46 Straight portion
50 Body portion
51 Body portion
52 Groove portion
60 Fixing member

What is claimed is:
1. A routing member comprising:
a body portion having a columnar shape; and
a groove portion in which a wire is to be accommodated, the groove portion being formed on an outer circumferential side of the body portion,
wherein the groove portion has a meandering portion extending in an axial direction of the body portion while meandering.
2. The routing member according to claim 1,
wherein the meandering portion meanders in a circumferential direction of the body portion.
3. The routing member according to claim 2,
wherein the meandering portion has a shape including a U-shape in a plan view in a radial direction of the body portion.
4. The routing member according to claim 2,
wherein the meandering portion has a shape including an S-shape in a plan view in a radial direction of the body portion.
5. The routing member according to claim 1,
wherein a plurality of the groove portions are formed on the outer circumferential side of the body portion, and each of the plurality of groove portions has the meandering portion.
6. The routing member according to claim 5,
wherein the plurality of groove portions are formed radially with a center axis of the body portion as a center.
7. The routing member according to claim 1,
wherein an end portion in the axial direction of the body portion has a spindle shape.
8. The routing member according to claim 1,
wherein the body portion has an open-hole portion penetrating the body portion in the axial direction, and the groove portion is formed on an outer circumferential side of the open-hole portion.

9. A wire harness comprising:
the routing member according to claim 1; and
the wire accommodated in the groove portion and routed along the groove portion.

10. The wire harness according to claim 9, further comprising a fixing member fixing the routing member to an outer circumferential surface of the wire.

* * * * *